(12) United States Patent
Tanaka et al.

(10) Patent No.: US 6,266,300 B1
(45) Date of Patent: Jul. 24, 2001

(54) OPTICAL DEFLECTION DEVICE HAVING ELECTROMAGNETIC DRIVER ASSEMBLED THEREIN FOR ROTATIONALLY DRIVING OPTICAL DEFLECTION ELEMENT

(75) Inventors: Akihiro Tanaka, Kanagawa; Masataka Nishiyama, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/085,232

(22) Filed: May 27, 1998

(30) Foreign Application Priority Data

May 27, 1997 (JP) .................................................. 09-136893

(51) Int. Cl.[7] .................................................. G11B 7/0025
(52) U.S. Cl. ............................................................ 369/44.22
(58) Field of Search ...................................... 369/112, 119, 369/44.15, 44.16, 44.17, 44.21, 44.22; 359/814, 223, 196, 198, 211, 212, 221, 515, 543, 872

(56) References Cited

U.S. PATENT DOCUMENTS

| 3,624,574 | * | 11/1971 | Montagu | 335/230 |
| 4,511,212 | * | 4/1985 | Tanaka | 350/255 |
| 4,855,982 | * | 8/1989 | Orlicki et al. | 369/54 |
| 5,099,352 | | 3/1992 | Yamamoto et al. | 359/213 |
| 5,247,508 | | 9/1993 | Tanaka | 369/112 |
| 5,249,173 | | 9/1993 | Tanaka | 369/119 |
| 5,414,563 | | 5/1995 | Tanaka | 359/814 |
| 5,455,706 | * | 10/1995 | Brotz | 359/198 |
| 5,463,612 | * | 10/1995 | Date | 369/219 |
| 5,486,944 | * | 1/1996 | Bard et al. | 359/198 |
| 5,870,219 | * | 2/1999 | Plesko | 359/199 |
| 5,926,307 | * | 7/1999 | Tanaka et al. | 359/224 |
| 5,959,758 | * | 9/1999 | Seo | 359/198 |
| 5,966,253 | * | 10/1999 | Tanaka et al. | 359/837 |
| 6,014,205 | * | 1/2000 | Kanazawa et al. | 356/73 |
| 6,046,866 | * | 4/2000 | Ikegame | 359/823 |

FOREIGN PATENT DOCUMENTS

| 58-88836 | * | 5/1983 | (JP) . |
| 58-90174 | * | 5/1983 | (JP) . |
| 63-32755 | * | 2/1988 | (JP) . |
| 7-192075 | * | 7/1995 | (JP) . |
| 10-333071 | * | 12/1998 | (JP) . |

* cited by examiner

Primary Examiner—William Klimowicz
Assistant Examiner—Tianjie Chen
(74) Attorney, Agent, or Firm—Greenblum & Bernstein, P.L.C.

(57) ABSTRACT

An optical deflection device is used to deflect a light beam, such as a laser beam, and comprises a base member, a movable member having an optical deflection element, and a set of spring elements provided at respective sides of the movable member such that the movable member is resiliently supported by the spring elements with respect to the base member. An electromagnetic driver rotationally drives the movable member with respect to the base member, and includes first and second sets of permanent magnets provided on the base member to produce first and second magnetic fields. The fields are reversed with respect to each other. The driver further includes first and second electromagnetic coils provided on the movable member and disposed in the fields. The respective first and second coils are electrically energized in the first and second fields in such a manner that electric currents flow through the first and second coils in opposite directions, whereby the respective first and second coils are subjected to rotational forces in the same rotational direction.

10 Claims, 10 Drawing Sheets

OPTICAL DEFLECTION DEVICE HAVING ELECTROMAGNETIC DRIVER ASSEMBLED THEREIN FOR ROTATIONALLY DRIVING OPTICAL DEFLECTION ELEMENT

BACKGROUND OF THE INVENTION

1. Field of the Invention

The present invention generally relates to an optical deflection device for deflecting a light beam, such as a laser beam, which is used, for example, as an element of an optical system for recording digital data on and reading the recorded digital data from an optical disk or optical-magnetic disk, and, in particular, to such an optical deflection device having an electromagnetic driver assembled therein for rotationally driving an optical deflection element, which deflects a light beam made incident thereon.

2. Description of the Related Art

As a representative optical deflection device, a galvano-mirror device is well known. The galvano-mirror device comprises a yoke member, a movable member rotatably supported by the yoke member through the intermediary of a pair of resilient elements, an optical deflection element, such as a prism, a mirror or the like, securely attached to the movable member, and an electromagnetic driver for rotationally driving the movable member with respect to the yoke member.

The electromagnetic driver includes a pair of permanent magnets provided on the yoke member, and an electromagnetic coil provided on the movable member and interposed between the permanent magnets. The electromagnetic coil is disposed in a magnetic field, generated by the pair of permanent magnets, and the movable member, carrying the optical deflection element, is rotated in accordance with Fleming's Rule, when the electromagnetic coil is electrically energized.

In general, there is a demand for the optical deflection device to have a constructional compactness and for the movable member, and therefore the optical deflection element, to exhibit a high-speed drive capability. The high-speed drive capability of the optical deflection element depends upon a product of the magnetic flux density (B) of a magnetic field, produced by the permanent magnets, and a wire length (L) of the electromagnetic coil, i.e. B×L. An increase in the magnetic flux density (B) results in a bulkiness of the optical deflection device. Accordingly, the wire length (L) of the electromagnetic coil should be increased in order for the high-speed drive capability of the optical deflection element to be improved.

Nevertheless, the longer the wire length (L) of the electromagnetic coil, the larger a resistance and a self-inductance of the electromagnetic coil. Thus, it is difficult to improve the high-speed drive capability of the optical deflection element by merely extending the wire length (L) of the electromagnetic coil.

SUMMARY OF THE INVENTION

Therefore, an object of the present invention is to provide an optical deflection device, having an electromagnetic driver assembled therein for rotationally driving an optical deflection element, wherein a high-speed drive capability of the optical deflection element can be efficiently and effectively improved without substantially increasing a bulkiness of the optical deflection device.

In accordance with the present invention, there is provided an optical deflection device comprising a base member, a movable member having an optical deflection element, such as a prism element, a reflective mirror element, a light-beam-deflecting hologram element or the like, a set of resilient support elements at the sides of the movable member and interposed between the base member and the movable member, such that the movable member is resiliently and movably supported by the resilient elements with respect to the base member, and an electromagnetic driver that rotationally drives the movable member with respect to the base member. The electromagnetic driver includes a first set of permanent magnets provided on the base member to produce a first magnetic field, and a second set of permanent magnets provided on the base member to produce a second magnetic field, and the first set of permanent magnets and the second set of permanent magnets are reversed arrangements such that the first magnetic field and the second magnetic field are reversed with respect to each other. The electromagnetic driver further includes a first electromagnetic coil provided on the movable member and disposed in the first magnetic field, a second electromagnetic coil provided on the movable member and disposed in the second magnetic field, and the respective first and second electromagnetic coils are electrically energized in the first and second magnetic fields in such a manner that electric currents flow through the first and second electromagnetic coils in opposite directions, whereby the respective first and second electromagnetic coils are subjected to rotational forces in the same rotational direction.

Preferably, the movable member comprises a holder portion for receiving the optical deflection element, resulting in a simple and compact arrangement of the optical deflection device. In this case, the first and second electromagnetic coils may be symmetrically provided on the holder portion about a vertical plane that includes the center of mass of the holder portion. The holder portion of the movable member may be cylinder-shaped.

Preferably, the permanent magnets in the first set are sector-shaped, and are associated with each other to surround the first electromagnetic coil, and the permanent magnets in the second set are sector-shaped, and are associated with each other to surround the second electromagnetic coil. In this case, the sector-shaped permanent magnets in each set are arranged such that opposite magnetic poles are opposing each other.

So that stable and reliable resilient and movable support of the movable member can be obtained, each of the resilient support elements may comprise a leaf-spring assembly which is formed from a plurality of leaf-spring elements arranged at uniformly angular intervals around an elastic-main-axis of the movable member.

The elastic-main-axis of the movable member may coincide with an inertial-main-axis of the movable member, to thereby ensure a stable and reliable rotational movement of the movable member. Alternatively, the elastic-main-axis of the movable member may coincide with a thrust-main-axis of the movable member, to thereby ensure a stable and reliable rotation of the movable member. Preferably, the elastic-main-axis of the movable member coincides with both the inertial-main-axis and the thrust-main-axis of the movable member, to thereby obtain a greater stability e and reliability of the movable member's rotational movement. Also, the leaf-spring elements are preferably identical to each other.

The optical deflection device may further comprise a set of releasable couplings, provided at the sides of the movable member, releasably connecting an end of the corresponding leaf-spring assembly to the movable member, whereby simple and correct mounting of the leaf-spring between the base member and the movable member can be obtained.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
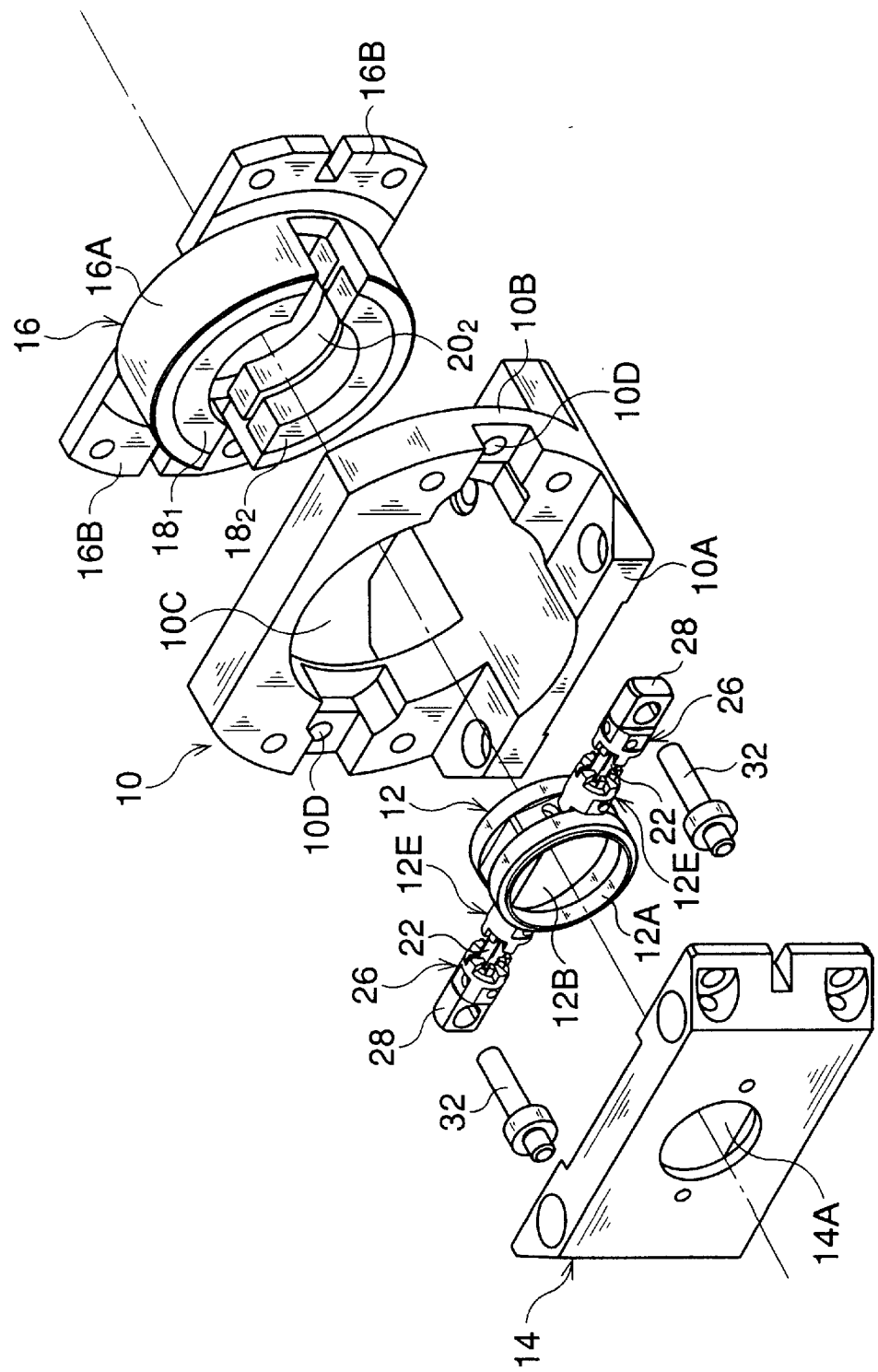
FIG. 1 is an exploded perspective view of an optical deflection device according to the present invention.

FIG. 1 shows an optical deflection device according to the present invention, which comprises a base member 10 made of a suitable metal, such as aluminum, an aluminum alloy or the like. The base member 10 includes a root portion 10A, and a frame portion 10B, formed with a circular-opening 10C, unitarily extended vertically from the root portion 10A. During assembly, the root portion 10A is used for attaching the optical deflection device to an optical system. When operating, the optical system records digital data on and reads the recorded digital data from an optical disk or optical-magnetic disk.

The optical deflection device also comprises a movable member 12 having a cylindrical shape. The movable member 12 is constituted as a part of the optical deflection device, and is received in the circular opening 10C of the base member 10 in a manner stated in detail hereinafter.

The optical deflection device further comprises a generally-rectangular cover member 14 attached to a front side of the base member 10, and a magnet holder member 16 attached to a rear side of the base member 10. The generally-rectangular cover member 14 has a circular opening 14A formed therein. The magnet holder member 16 includes a collar-shaped holder portion 16A, and two lug portions 16B unitarily extended diametrically from sides of the holder portion 16A. Preferably, the cover member 14 and the magnet holder member 16 may be made of the same metal as that of the base member 10.

Note, the holder portion 16A defines a part of the base member 10, and may be integrally formed with the base member 10, if necessary.

Two sets of sector-shaped permanent magnets ($18_1$; $18_2$ and $20_1$; $20_2$) are located in the holder portion 16A, and the permanent magnets ($18_1$; $18_2$ and $20_1$; $20_2$) in each set are arranged such that opposite magnetic poles are opposing each other in a manner as mentioned in detail hereinafter. Note, in FIG. 1, one ($20_1$) of the permanent magnets $20_1$; and $20_2$ is not visible. The lug portions 16B are used for attaching the magnet holder member 16 to the base member 10. The attachment is performed such that the holder portion 16A is accommodated in the circular opening 10C of the frame portion 10B.

Figure 2:
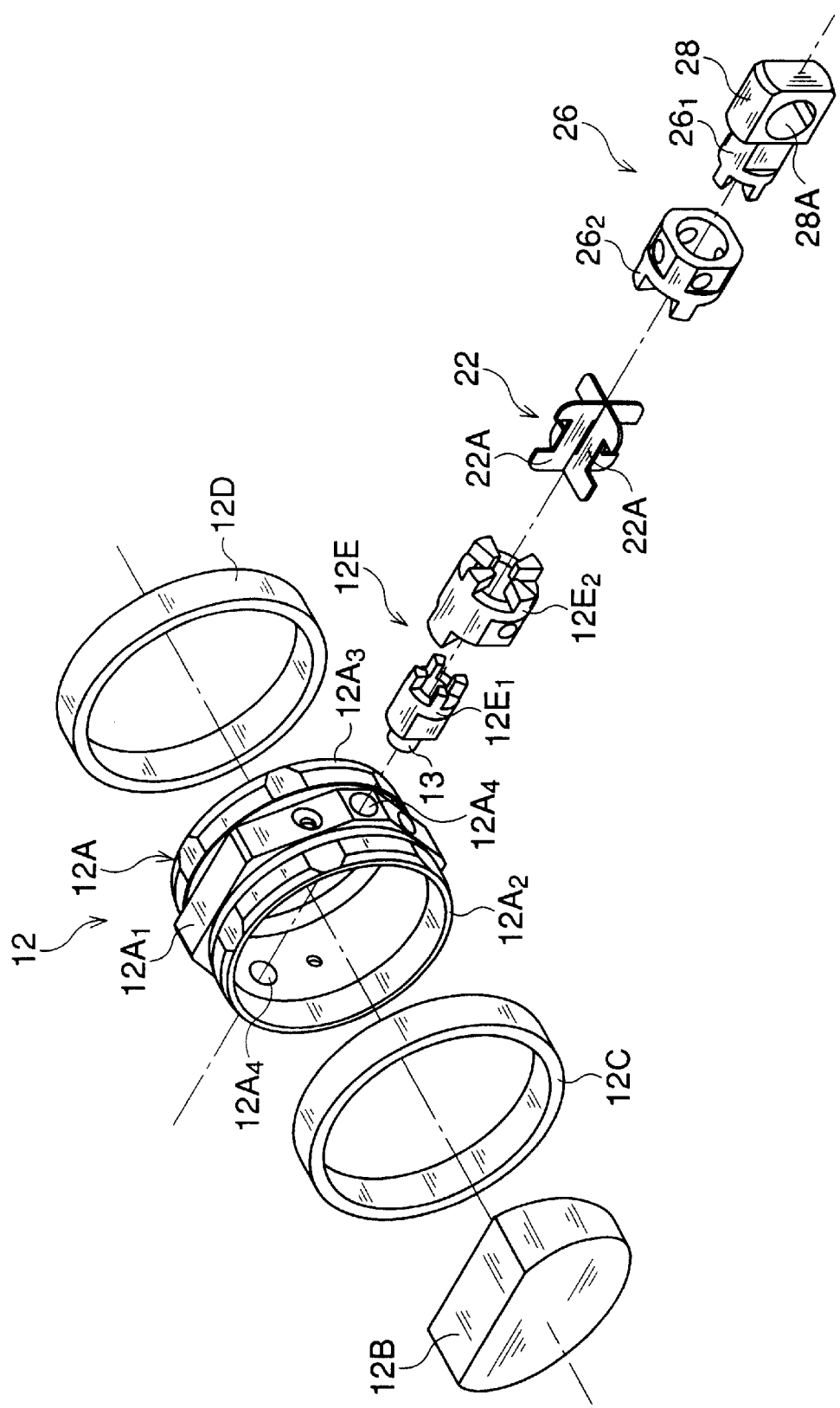
FIG. 2 is an exploded perspective view of a movable member of the optical deflection device shown in FIG. 1.

As best shown in FIG. 2, the movable member 12 comprises a cylindrical holder portion 12A for receiving a prism element 12B, which serves as an optical deflection element. In this embodiment, another type of optical deflection element, such as a reflective mirror element, a light-beam-deflecting hologram element or the like, may be substituted for the prism element 12B.

The cylindrical holder portion 12A includes a central flange $12A_1$, having a polygonal shape, two collar elements $12A_2$ and $12A_3$ protruding from respective sides of the central flange $12A_1$, and two electromagnetic coils 12C and 12D mounted on the collar elements $12A_2$ and $12A_3$, respectively. As is apparent from FIG. 2, when the electromagnetic coils 12C and 12D are mounted on the collar elements $12A_2$ and $12A_3$, these coils 12C and 12D are symmetrically positioned on the holder portion 12A about a vertical plane that includes the center of mass of the holder portion 12A, hereinafter referred to as the neutral plane. The electromagnetic coils 12C and 12D operate in conjunction with the two sets of sector-shaped permanent magnets ($18_1$; $18_2$ and $20_1$; $20_2$), thereby rotatably driving the movable member 12, and therefore the prism element 12B.

Note, in FIG. 2, although each of the electromagnetic coils 12C and 12D is illustrated as a mere ring element, the coils 12C and 12D are actually formed by turning a wire into a ring-like shape.

When the optical deflection device is assembled, the sector-shaped permanent magnets $18_1$ and $18_2$ are associated with each other so as to surround the electromagnetic coil 12C, and the sector-shaped permanent magnets $20_1$; and $20_2$ are associated with each other so as to surround the electromagnetic coil 12D. According to the present invention, an electromagnetic relationship between the two sets of sector-shaped permanent magnets ($18_1$; $18_2$ and $20_1$; $20_2$) and the electromagnetic coils 12C and 12D is very significant, and will be explained later in detail with reference to FIGS. 6 and 7.

The movable member 12 is further provided with two couplings 12E diametrically fixed to the central flange $12A_1$. Each of the couplings 12E includes an immovable coupling part $12E_1$, and a movable coupling part $12E_2$ detachably associated therewith. In particular, the central flange $12A_1$ has two narrow diametrically-opposed side faces, in each of which a threaded hole $12A_4$ is formed. Each immovable coupling part $12E_1$ has an integrally-formed screw 13 protruding therefrom, and the screw 13 of the immovable coupling part $12E_1$ is fixedly threaded in the hole $12A_4$. Note, in FIG. 2, only one of the couplings 12E is illustrated.

Figure 3:
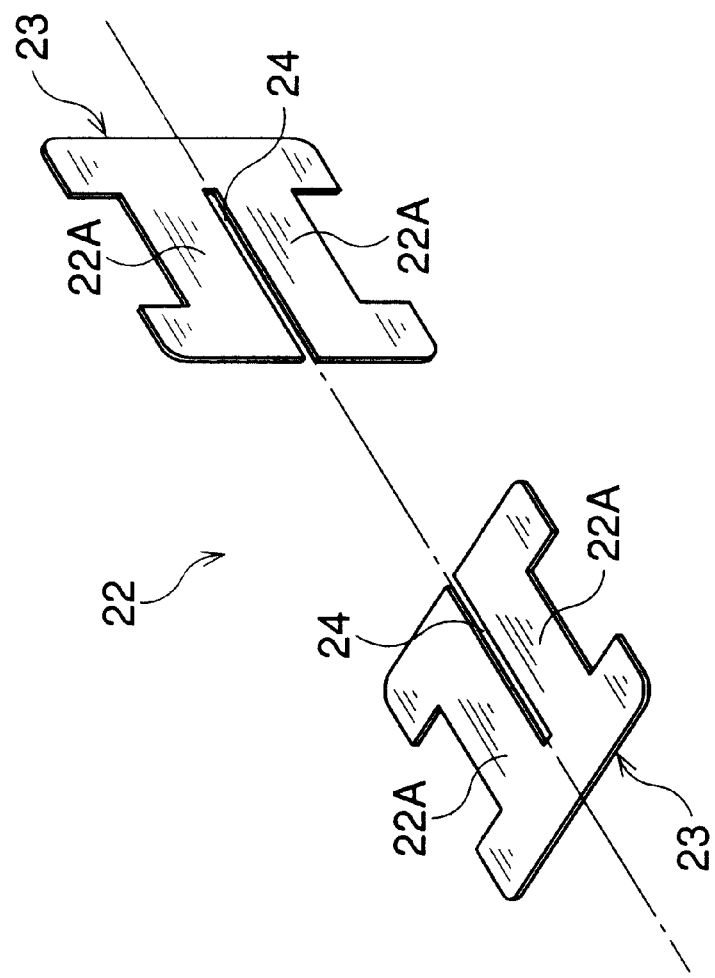
FIG. 3 is an exploded perspective view of a leaf-spring assembly of the optical deflection device shown in FIG. 1.

A leaf-spring assembly 22 is connected at its one end to each of the couplings 12E, and is composed of two H-shaped spring plates 23, as shown in FIG. 3. The H-shaped spring plates 23 are identical to each other, and a central slit 24 is longitudinally formed in each spring plate 23, such that two leaf spring elements 22A are defined therein. The leaf-spring assembly 22 is obtained from the two H-shaped spring plates 23 by crosswisely interlinking them via the central slits 24 thereof. Thus, in this embodiment, a leaf-spring assembly 22 is formed from the four leaf spring elements 22A spaced apart from each other at uniformly angular intervals around a central longitudinal axis of the leaf-spring assembly 22, so as to define an angle of 90 degrees between two contiguous leaf spring elements 22A.

As is apparent from FIG. 2, the other end of the leaf-spring assembly 22 is connected to another coupling 26, which includes an immovable coupling part $26_1$, and a movable coupling part $26_2$ detachably associated therewith. The coupling 26 is substantially identical to the coupling 12E, except that the immovable coupling part $26_1$ is provided with an integrally-formed block element 28 in place of the screw 13 of the immovable coupling part $12E_1$ The block element 28 has a through-hole 28A formed therein, and is used for securely attaching the immovable coupling part $26_1$ to the base member 10.

Figure 4:
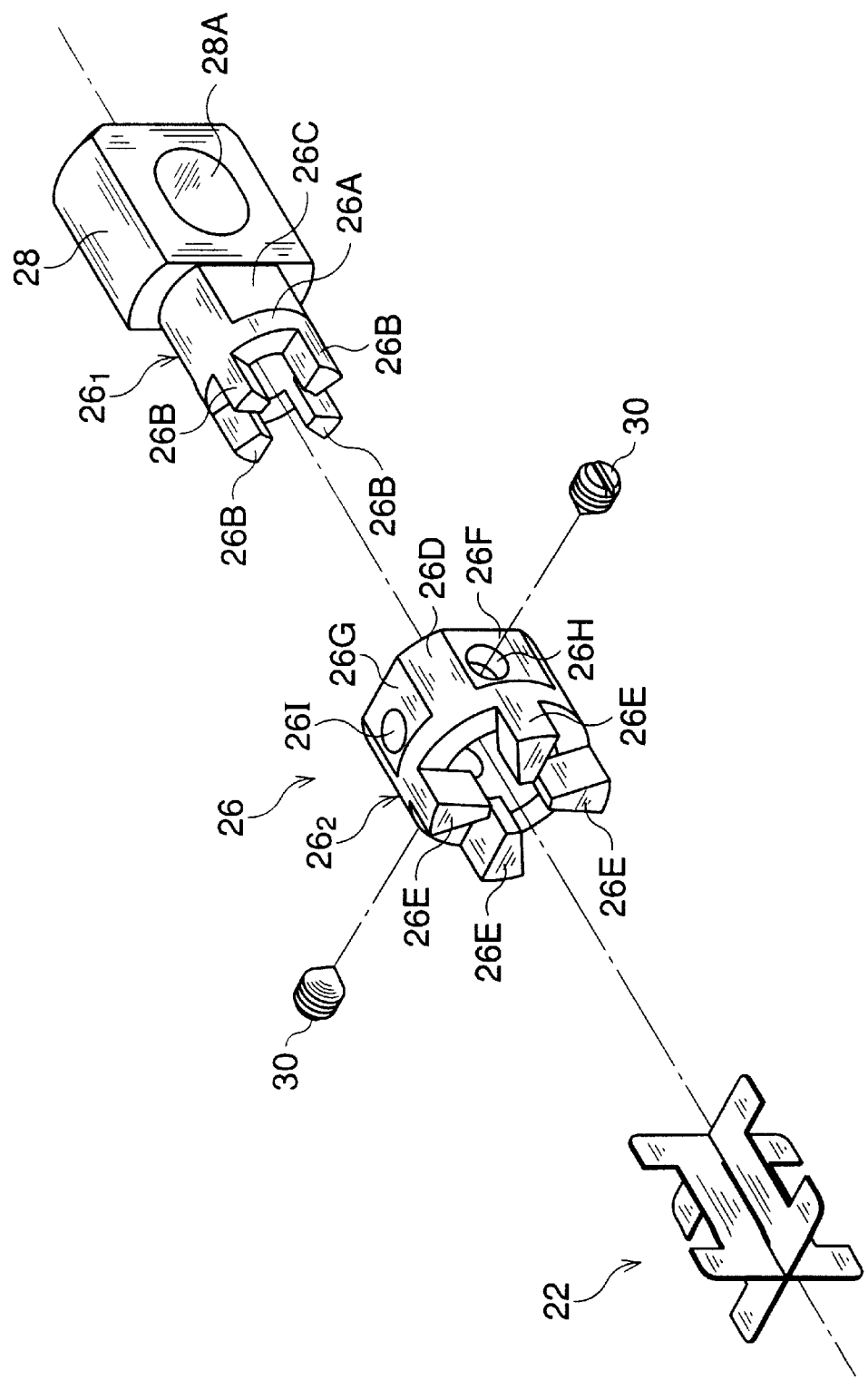
FIG. 4 is an exploded perspective view of a coupling for the leaf-spring assembly shown in FIG. 3.

As best shown in FIG. 4, the immovable coupling part $26_1$ as a castellated element 26A unitarily extending from the block element 28. Four prong elements 26B protrude from the projecting-end face of the castellated element 26A. The four prong elements 26B are spaced apart from each other at uniformly angular intervals around a central longitudinal axis of the castellated element 26A, so as to define an angle of 90 degrees between the neutral planes of two adjacent prong elements 26B. Also, the four prong elements 26B are identical to each other, each of the prong elements 26B having a sector-shaped cross-section. The castellated element 26A has a set of flat faces 26C formed thereon, the flat faces 26C being diametrically opposed to each other. Note, in FIG. 4, only one of the flat faces 26C is visible.

The movable coupling part $26_2$ of the coupling 26 comprises a tubular castellated element 26D, a diameter of which is larger than that of the castellated element 26A, enabling the castellated element 26A of the immovable coupling part $26_1$ to be slidably and rotatably received in the tubular castellated element 26D of the movable coupling part $26_2$. The castellated element 26D has four prong elements 26E, the four prong elements 26E being spaced apart from each other at uniformly angular intervals around a central longitudinal axis of the castellated element 26D, so as to define an angle of 90 degrees between the neutral planes of two adjacent prong elements 26E.

Similar to the prong elements 26B of the immovable coupling part $26_1$, the four prong elements 26E are identical to each other, each of the prong elements 26E having a sector-shaped cross-section. The castellated element 26D has two sets of flat faces 26F and 26G formed thereon, and the flat faces (26F, 26G) in each set are diametrically opposed to each other. Each of the flat faces 26F has a threaded hole 26H formed therein, and each of the flat faces 26G has a threaded hole 26I formed therein. Note, in FIG. 4, only one of the flat faces 26F is visible, and only one of the flat faces 26G is visible.

Figure 5:
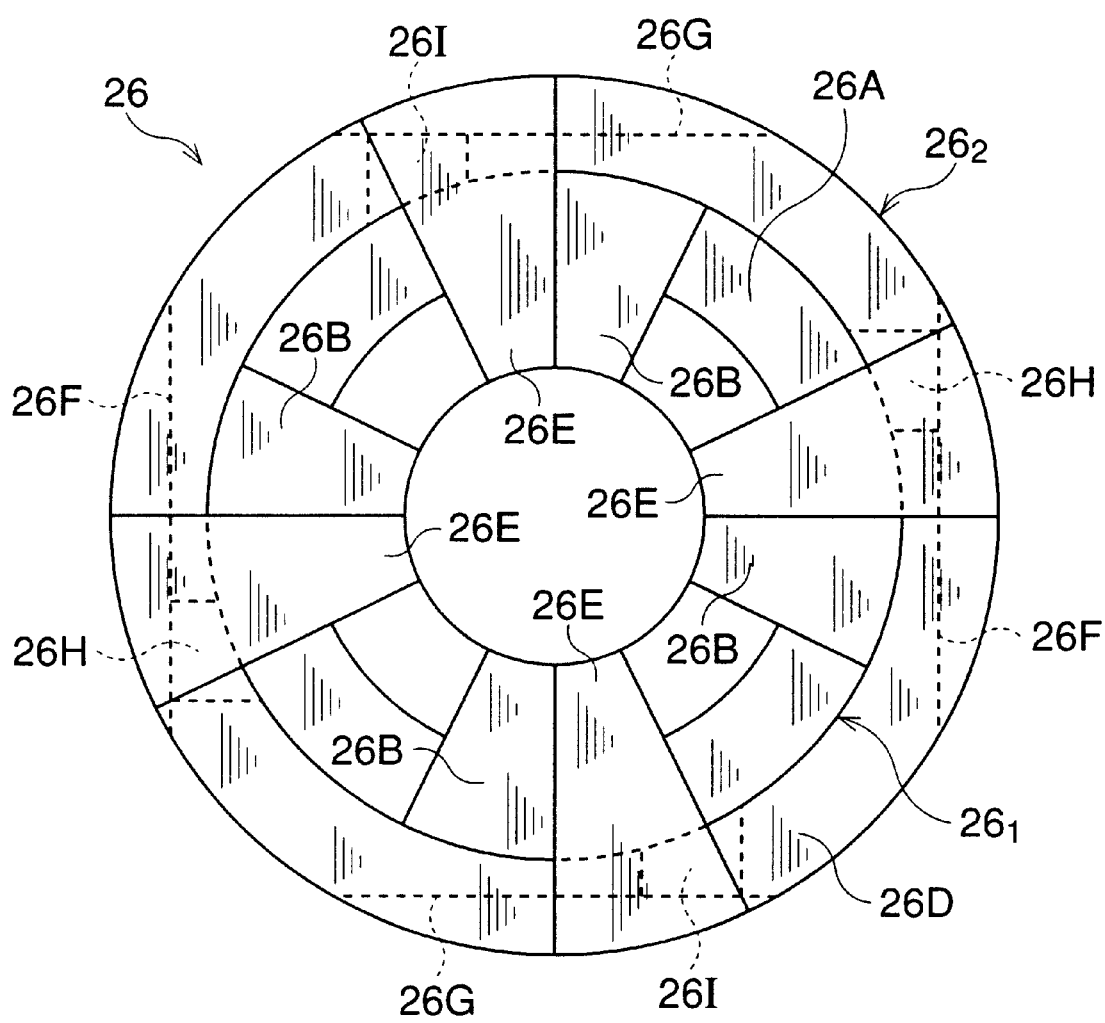
FIG. 5 is a front view of the coupling of FIG. 4.

As best shown in FIG. 5, each of the threaded holes 26H and 26I is not positioned at a center of the corresponding flat face (26F, 26G). In particular, the respective threaded holes (26H, 26I) in each set are offset from the centers of the corresponding flat faces (26F, 26G) while remaining diametrically opposed. In other words, the threaded holes 26H and 26I are arranged so as to be offset from the centers of the flat faces 26F and 26G, respectively, in a counter-clockwise direction in FIG. 5.

Accordingly, after the castellated element 26A of the immovable coupling part $26_1$ is slidably and rotatably received in the tubular castellated element 26D of the movable coupling part $26_2$, as shown in FIG. 5, two screws 30 (FIG. 4) are threaded in two diametrically-opposed holes (26H or 26I), dependent upon the orientation of the tubular castellated element 26D with respect to the flat faces 26C of the castellated element 26A, until the respective tips of the screws 30 abut the flat faces 26C. The movable coupling part $26_2$ is thereby subjected to a clockwise rotational force, whereby each of the prong elements 26E of the movable coupling part $26_2$ is pressed against the corresponding prong element 26B of the immovable coupling part $26_1$.

Thus, after a crosswise end of the leaf-spring assembly 22 is engaged with the coupling 26, such that the four respective ends of the leaf spring elements 22A are located and clamped between the prong elements 26B and 26E, by threading the screws 30 in the diametrically-opposed holes (26H or 26I), the leaf-spring assembly 22 can be securely connected to the coupling 26.

Note, a secure connection between the coupling 12E and the other crosswise end of the leaf-spring assembly 22 can be carried out in the same manner as with the coupling 26, because a structure of the coupling 12E is identical to that of the coupling 26, as mentioned above.

As is apparent from FIG. 1, each couplings 26 is securely attached to the frame portion 10B of the base member 10, by inserting a bolt element 32 into the through-hole 28A of the block element 28, and then by threading the bolt element 32 into a corresponding threaded hole 10D formed in the frame portion 10B. The threaded holes 10D are located in two respective diametrically-formed recesses in the frame portion 10B, whereby each of the couplings 26 is accommodated in the corresponding recess. Thus, the movable member 12 is supported by the frame portion 10B through the intermediary of a set of leaf-assemblies 22.

In short, use of the set of releasable couplings 12E and 26 enables simple and correct mounting of the leaf-spring assemblies 22 between the base member 10 and the movable member 12.

Figure 6:
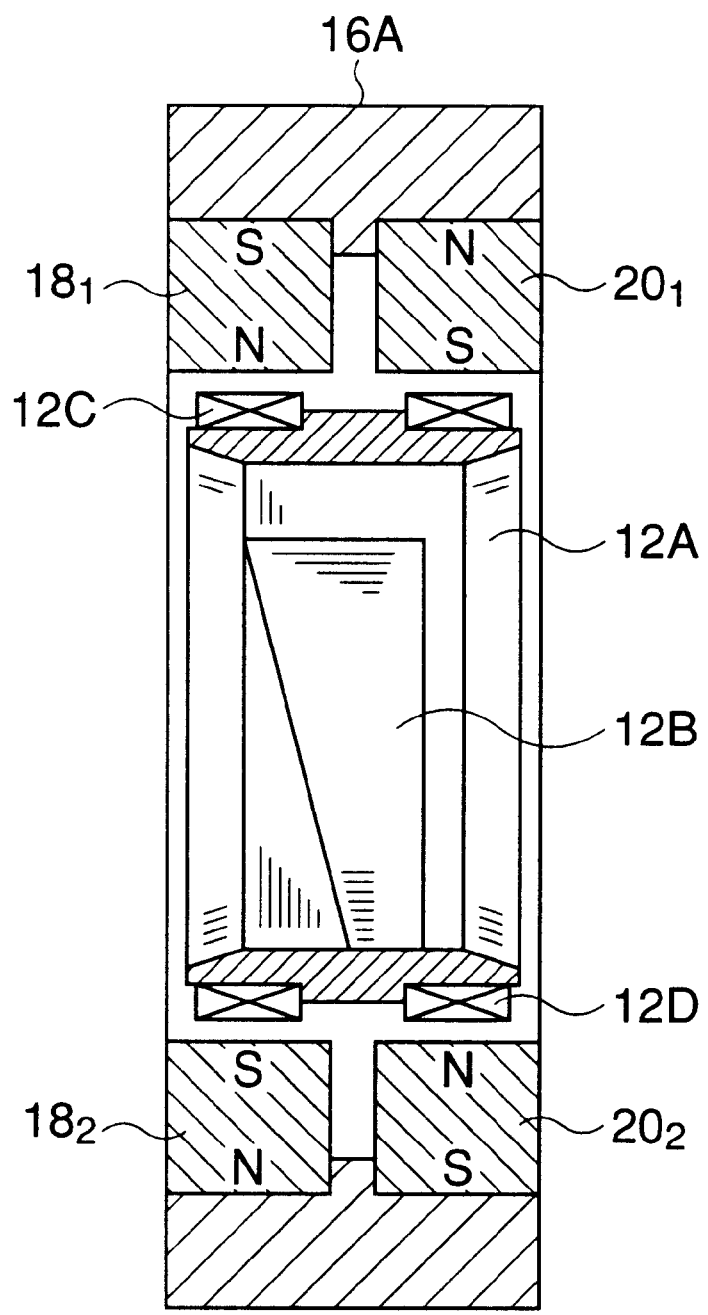
FIG. 6 is a longitudinally-sectioned view of the movable member, showing two electromagnetic coils, provided thereon, together with two sets of sector-shaped permanent magnets associated therewith, as shown in FIG. 1.

As mentioned above, according to the present invention, the sector-shaped permanent magnets ($18_1$; $18_2$ and $20_1$; $20_2$) are arranged such that opposite magnetic poles are opposing each other, as shown in FIG. 6. Namely, as is apparent from this drawing, the inner pole of the permanent magnet $18_1$ is the N-pole, whereas the inner pole of the permanent magnet $20_1$ is the S-pole. Similarly, the inner pole of the permanent magnet $18_2$ is the S-pole, whereas the inner pole of the permanent magnet $20_2$ is the N-pole. In short, the respective magnetic fields, produced by the sets of sector-shaped permanent magnets ($18_1$; $18_2$ and $20_1$; $20_2$) are reversed with respect to each other.

On the other hand, when the optical deflection device is driven, the respective electromagnetic coils 12C and 12D are electrically energized in the magnetic fields, produced by the two sets of permanent magnets ($18_1$; $18_2$ and $20_1$; $20_2$), in such a manner that electric currents flow through the electromagnetic coils 12C and 12D in opposing directions, as symbolically shown in FIG. 7. Thus, the electromagnetic coils 12C and 12D are subjected to the rotational forces F in the same direction, in accordance with Fleming's Rule, whereby the movable member 12 is rotated in the rotational direction indicated by the forces F. Of course, the rotational direction of the movable member 12 depends upon a direction in which an electric current flows through each of the electromagnetic coils 12C and 12D.

Figure 7:
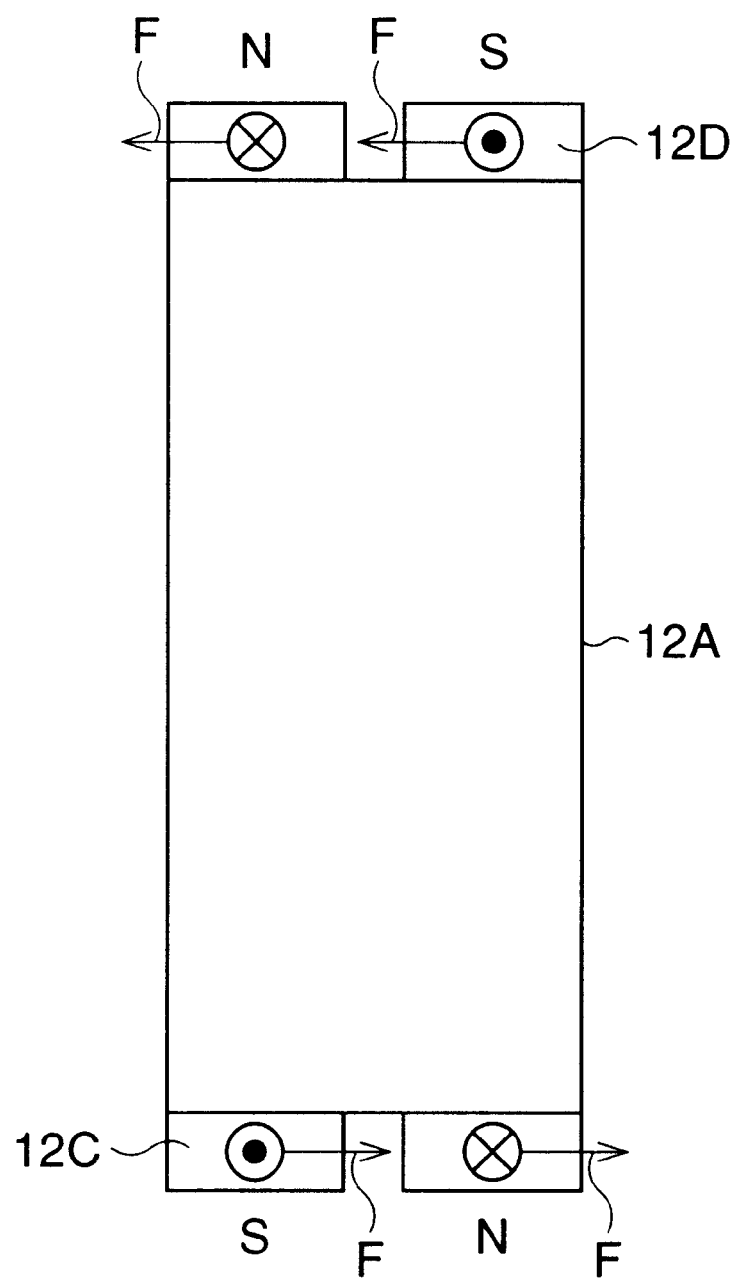
FIG. 7 is a schematic view corresponding to FIG. 6, showing the movable member with the two electromagnetic coils, symbolically indicating a direction in which an electric current flows through each of the electromagnetic coils.

According to the present invention, during the electrical energization of the electromagnetic coils 12C and 12D, these coils 12C and 12D are not subjected to any mutual inductance, due to the electric currents flowing through the electromagnetic coils 12C and 12D in opposing directions, shown in FIG. 7. Therefore, it is possible to efficiently and effectively increase a high-speed drive capability of the movable member 12 without an increase in a bulkiness of the optical deflection device.

Figure 8:
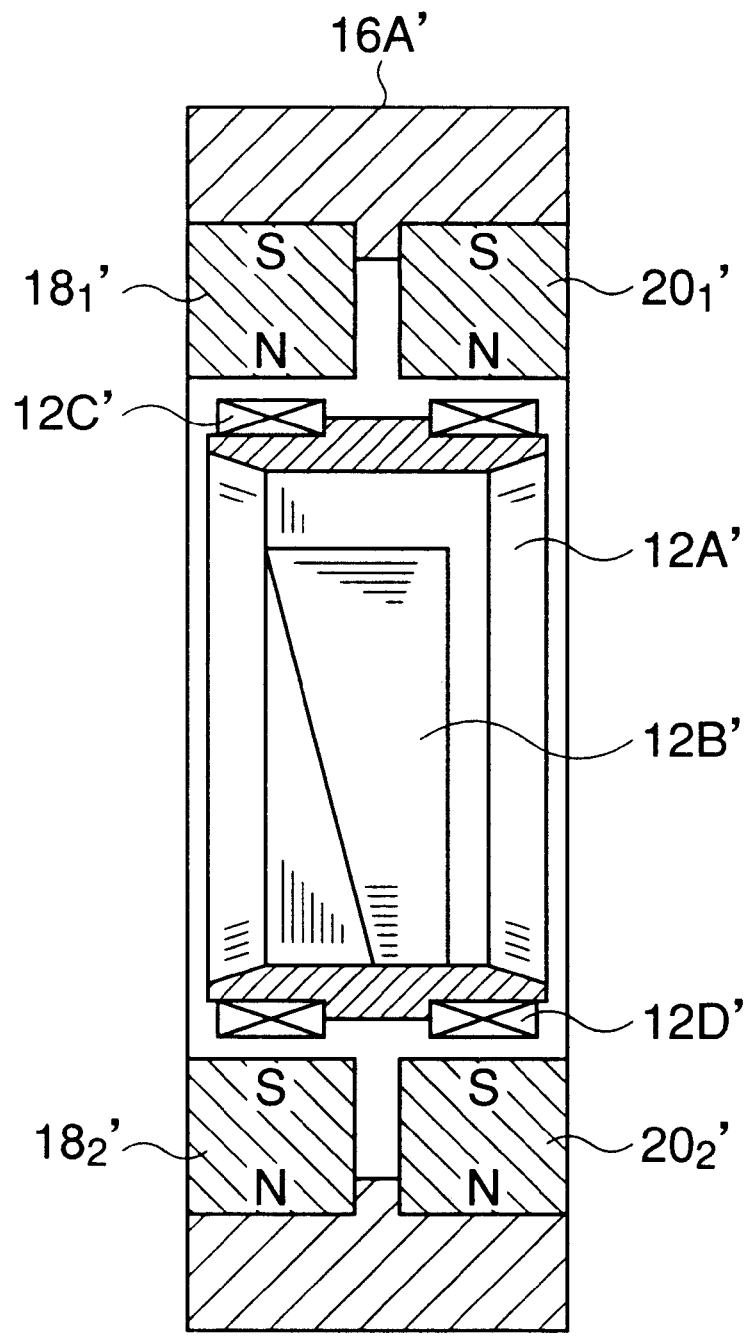
FIG. 8 is a longitudinally-sectioned view similar to FIG. 6, showing a comparative embodiment of the present invention.

FIG. 8, similar to FIG. 6, shows a comparative embodiment of the present invention. Note, in this drawing, elements identical to those of FIG. 6 are indicated by like references primed. This comparative embodiment is derived from the process of development of an optical deflection device according to the present invention.

As shown in FIG. 8, in the comparative embodiment, although the sector-shaped permanent magnets ($18_1'$; $18_2'$ and $20_1'$; $20_2'$) in each set are arranged such that opposite magnetic poles are opposing each other, the inner poles of the permanent magnets $18_1'$ and $20_1'$ are the same (N), and the inner poles of the permanent magnets $18_2'$ and $20_2'$ are the same (S).

Figure 9:
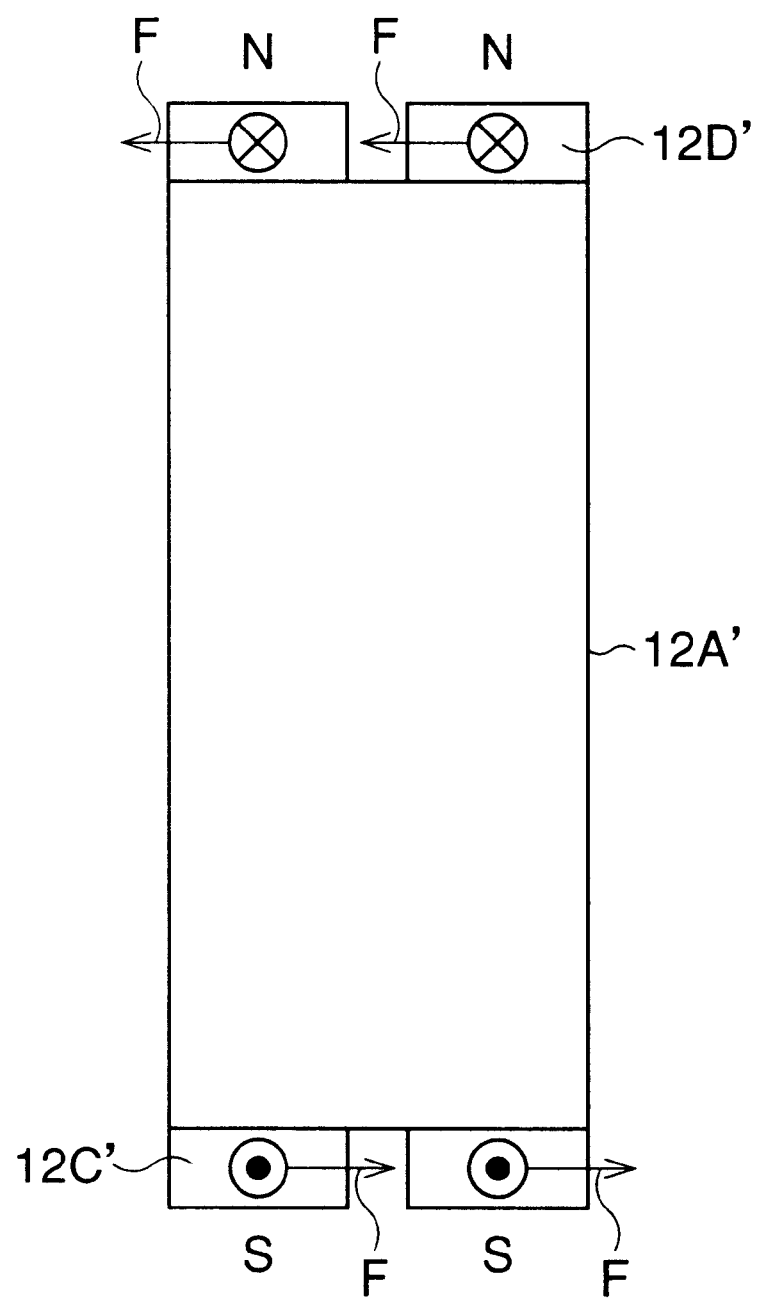
FIG. 9 is a schematic view corresponding to FIG. 8, showing the movable member with the two electromagnetic coils, symbolically indicating a direction in which an electric current flows through each of the electromagnetic coils.

Accordingly, before the movable member 12A' can be rotated in one of the rotational directions, the respective electromagnetic coils 12C' and 12D' are electrically energized in the magnetic fields, produced by the two sets of permanent magnets ($18_1'$; $18_2'$ and $20_1'$; $20_2'$), in such a manner that electric currents flow through the electromagnetic coils 12C' and 12D' in the same direction, as symbolically shown in FIG. 9.

Nevertheless, a mutual inductance is produced in each of the electromagnetic coils 12C' and 12D', and thus it is impossible to efficiently and effectively improve a high-speed drive capability of the movable member 12A', and consequently, the optical deflection element or prism 12B'.

When the optical deflection device is driven, the movable member 12 is rotated around a central longitudinal axis of the leaf-spring assemblies 22, because the leaf-spring assemblies 22 exhibit a high compliance around the central longitudinal axis thereof.

Figure 10:
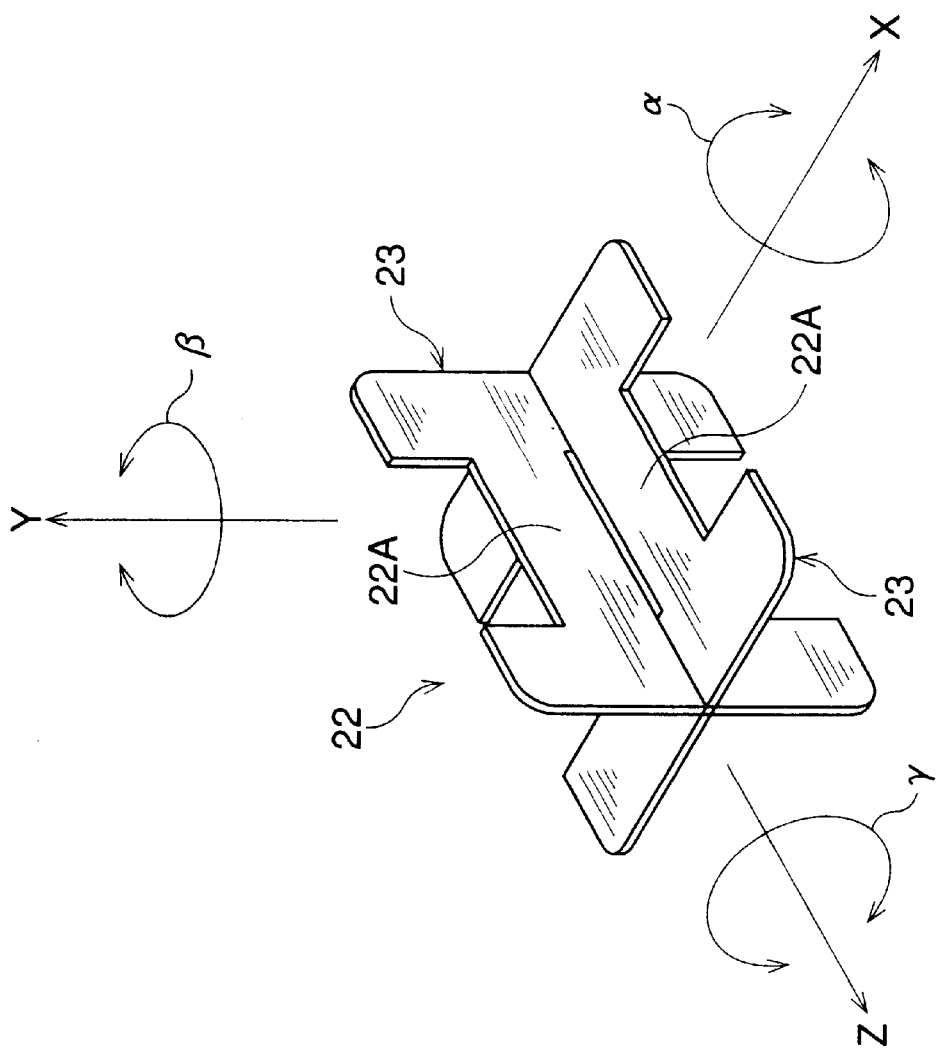
FIG. 10 is a perspective view of the leaf-spring assembly shown in FIG. 1.

In particular, as shown in FIG. 10, when a three dimensional coordinate system is defined with respect to each leaf-spring assembly 22, such that a H-shaped spring plate 23 is included in both the X-Z plane and the Y-Z plane of the coordinate system, and such that the central longitudinal axis of the leaf-spring assembly 22 coincides with the Z-axis of the coordinate system, the compliance (indicated by reference α) around the X-axis of the coordinate system is substantially equal to the compliance (indicated by reference β) around the Y-axis of the coordinate system, which is considerably lower than the compliance (indicated by reference γ) around the Z-axis of the coordinate system.

Accordingly, when the movable member 12 is subjected to the rotational forces F, the movable member 12 is rotated around the rotational axis defined by the cental longitudinal axes (Z-axis) of the set of leaf-spring assemblies 22, and is referred to as an elastic-main-axis of the movable member 12 hereinafter.

Also, as is apparent from the foregoing, since each of the leaf-spring assemblies 22 exhibits a high compliance only around the central longitudinal axis thereof, the leaf-spring assemblies 22 are less susceptible to structure-coupled-oscillations and thrust-coupled-oscillations. Note, the structure-coupled-oscillations are defined as coupled-oscillations produced in the leaf-spring assemblies 22 due to outside forces exerted upon the optical deflection device, and the thrust-coupled-oscillations are defined as coupled-oscillations produced in the leaf-spring assemblies 22 due to rotational forces of the movable member 12. In short, the rotational movement of the movable member 12 can be stably and reliably performed.

An arrangement of the mass of the movable member 12 is configured such that the center of mass thereof is located on the rotational axis of the movable member 12. Namely, the elastic-main-axis (Z-axis) of the movable member 12 may substantially coincide with an inertial-main-axis of the movable member 12, which passes through the center of mass thereof. By incorporation of this concept, a production of the structure-coupled-oscillations can be further suppressed in the leaf-spring assemblies 22.

Furthermore, an arrangement of the mass of the movable member 12 may be configured such that a rotational center thereof is located on the rotational axis of the movable member 12. Namely, the elastic-main-axis (Z-axis) of the movable member 12 may substantially coincide with a thrust-main-axis of the movable member 12, which passes through the rotational center thereof. By incorporation of this concept, a production of the thrust-coupled-oscillations can be further suppressed in the leaf-spring assemblies 22.

Of course, preferably, the elastic-main-axis, inertial-main-axis, and thrust-main-axis of the movable member 12 should coincide with each other, thereby ensuring greater suppression of the structure-coupled-oscillations and the thrust-coupled-oscillations in the leaf-spring assemblies 22, resulting in increasingly stable and reliable rotational movement of the movable member 12.

Finally, it will be understood by those skilled in the art that the foregoing description is of a preferred embodiment of the device, and that various changes and modifications may be made to the present invention without departing from the spirit and scope thereof.

The present disclosure relates to subject matter contained in Japanese Patent Application No. 9-136893 (filed on May 27, 1997), which is expressly incorporated herein, by reference, in its entirety.

What is claimed is:

1. An optical deflection device comprising:
   a base member;
   a movable member that includes an optical deflection element;
   a set of resilient support elements disposed at sides of said movable member and interposed between said base member and said movable member such that said movable member is resiliently and movably supported by said resilient support elements with respect to said base member; and
   an electromagnetic driver that rotationally drives said movable member with respect to said base member;
   wherein said electromagnetic driver includes:
     a first set of permanent magnets provided on said base member to produce a first magnetic field;
     a second set of permanent magnets provided on said base member to produce a second magnetic field;
     said first set of permanent magnets and said second set of permanent magnets having reversed arrangements such that said first magnetic field and said second magnetic field are reversed with respect to each other;
     a first electromagnetic coil provided on said movable member and disposed in said first magnetic field;
     a second electromagnetic coil provided on said movable member and disposed in said second magnetic field; and said respective first and second electromagnetic coils being electrically energized in said first and second magnetic fields in such a manner that electric currents flow through said first and second electromagnetic coils in opposite directions, whereby said respective first and second electromagnetic coils are subjected to rotational forces in a same rotational direction.

2. An optical deflection device as set forth in claim 1, wherein said movable member comprises a holder portion that receives said optical deflection element, and said first and second electromagnetic coils are symmetrically provided on said holder portion with respect to a neutral plane of said holder portion.

3. An optical deflection device as set forth in claim 2, wherein said permanent magnets in said first set are sector-shaped, and are associated with each other to surround said first electromagnetic coil, and said permanent magnets in said second set are sector-shaped, and are associated with each other to surround said second electromagnetic coil, said sector-shaped permanent magnets in each set being arranged such that opposite magnetic poles of two said sector-shaped permanent magnets are opposing each other.

4. An optical deflection device as set forth in claim 2, wherein the holder portion of said movable member is cylinder-shaped.

5. An optical deflection device as set forth in claim 1, wherein each of said resilient support elements comprises a leaf-spring assembly which is formed from a plurality of leaf-spring elements arranged at uniformly angular intervals around an elastic-main-axis of said movable member.

6. An optical deflection device as set forth in claim 5, wherein the elastic-main-axis of said movable member coincides with a rotational inertial-main-axis of said movable member.

7. An optical deflection device as set forth in claim 5, wherein the elastic-main-axis of said movable member coincides with a thrust-main-axis of said movable member.

8. An optical deflection device as set forth in claim 5, wherein the elastic-main-axis of said movable member coincides with both a rotational inertial-main-axis and a thrust-main-axis of said movable member.

9. An optical deflection device as set forth in claim 5, wherein all of said leaf-spring elements are identical to each other.

10. An optical deflection device as set forth in claim 5, further comprising a set of releasable couplings provided at the sides of said movable member, each of said releasable couplings releasably connecting an end of the corresponding leaf-spring assembly to said movable member.

* * * * *